United States Patent [19]

Altmann et al.

[11] Patent Number: 4,817,271

[45] Date of Patent: Apr. 4, 1989

[54] APPARATUS FOR THE MANUFACTURE OF A FLEXIBLE HEATING APPLIANCE

[75] Inventors: Dieter Altmann; Eberhard Haupt, both of Gründau-Rothenbergen, Fed. Rep. of Germany

[73] Assignee: I. G. Bauerhin GmbH, electro-technische Fabrik, Gruendau-Rothenbergen, Fed. Rep. of Germany

[21] Appl. No.: 8,091

[22] Filed: Jan. 21, 1987

Related U.S. Application Data

[63] Continuation of Ser. No. 756,265, Jul. 18, 1985.

[30] Foreign Application Priority Data

Apr. 6, 1985 [DE] Fed. Rep. of Germany ....... 3512616

[51] Int. Cl.[4] ............................................. B23P 19/04
[52] U.S. Cl. ......................................... 29/729; 29/611; 156/179
[58] Field of Search ................ 29/611, 613, 618, 729; 219/345, 528, 548, 549; 156/178, 179, 70, 290, 51, 52

[56] References Cited

U.S. PATENT DOCUMENTS 2,870,277 1/1959 Carter .................................... 29/611
3,191,005 6/1965 Cox II .................................. 219/345
3,622,417 11/1971 Gray, Jr. ............................. 156/213

FOREIGN PATENT DOCUMENTS 3013778 10/1981 Fed. Rep. of Germany ...... 219/528
46-39395 11/1971 Japan ..................................... 29/611

Primary Examiner—P. W. Echols
Attorney, Agent, or Firm—Gilbert L. Wells

[57] ABSTRACT

A method for manufacturing a flexible heating appliance comprises placing a heating circuit comprising at least one heating wire between two layers of textile material and combining the latter either directly or with the aid of an adhesive layer, by applying heat and pressure. A lower textile layer consisting of one or several sublayers is placed on the rigid surface of a nail-studded template and the heating circuit is then laid on the lower with its wire being guided about the nail ends protruding from that layer. A second, upper textile layer is then placed on top of the lower one and the heating circuit thereon, and the two layers are joined together by means of a superimposed ironing unit comprising a rigid heatable ironing plate and, on the underside of the latter, an elastic, temperature-stable, heat-conductive pressure plate which covers the remaining protruding ends of the nails, with heating of the ironing unit with pressure and thereby thermally combining the two textile layers.

3 Claims, 1 Drawing Sheet

APPARATUS FOR THE MANUFACTURE OF A FLEXIBLE HEATING APPLIANCE

This is a continuation of application Ser. No. 756,265, filed July 18, 1985.

BACKGROUND OF THE INVENTION

This invention relates to an apparatus for the manufacture of a flexible heating appliance, comprising at least one heating wire constituting an electrical heating circuit being placed between textile materials which are combinable with each other thermally, directly or with the aid of an additional adhesive layer, and combining the said textile materials by the application of heat and pressure.

Flexible heating appliances of the aforesaid kind have been known, for instance, from German Pat. No. 1,757,215 which provides for inserting heating conductors into woven-in channels in a textile fabric .In part, the heating conductors are already woven-in or are received between weldable, channel-forming layers, while the welding process itself is carried out by special high-frequency welding tools devised for this type of manufacturing method.

A simple method of fixation comprises the use of coated fabrics, webs or fleeces which are combinable in flat shape with each other, in the manner used in making outer wear or over-clothes. It is furthermore known to provide grooves or similar recesses in an ironing plate or ironing board, into which grooves the heating conductor being placed on the underneath layer, is pressed during the ironing treatment, so that there is no combination such as by welding in the zone of the groove or the like recess, and the heating conductor remains displaceable in the channel system being formed. Within the program of a further development of flexible heating bodies which can be used for heating seats, and in particular automobile seats, it was necessary to achieve a short heating-up period in order to provide a satisfactory heating of the seat surface, if possible within a very short time. A prerequisite for attaining this goal is an inherent softness of the flexible heating body which latter must lie directly under the cover material of the seat, while the heating circuit design must not become contrasted on the surface of the cover material.

For this purpose, thin heating conductors insulated with coatings having the properties of perfluoropolyethylenes such as Teflon, and whose diameter is smaller than 2 mm, have been sewn on to a lower layer of material, and have then been additionally affixed in position by covering layers of material being joined to the layer underneath by ironing. The layout in an ironing plate mentioned hereinbefore can be carried out much more rapidly, but it is necessary to this end that the nails which determine the layout of the heat carrier and its bends are depressable in grooves to be preferably flush with them during the ironing treatment.

Both of these known methods are expensive, as a lack of fit between the ironing plate and the nail template or stencil may cause serious damage to the template.

OBJECTS AND SUMMARY OF THE INVENTION

In view of the above-explained drawbacks of the known heating appliances, it is a principal object of the invention, to solve the task of providing an apparatus of the initially described kind which enables a combination, by ironing, of two textile layers each of which consists of one or several sublayers, with the heating circuit embedded therebetween, without loss of the exact positioning of the heating circuit during the ironing treatment.

This object and others that will become apparent as the description of the invention proceeds, are attained by providing an apparatus of the initially described kind which comprises, in accordance with the invention, (a) placing a lower textile layer consisting of one or several sublayers on the rigid surface of a nail-studded template in a manner such that the nails thereof protrude through that superimposed lower textile layer, (b) placing a heating circuit constituted by at least one heating wire on said lower textile layer and around the nail ends protruding therefrom, in accordance with a pre-determined circuitry layout, (c) superimposing an upper textile layer, consisting of one or several sublayers, on to the lower textile layer and the heating circuit thereon, in a manner such that said protruding nail ends penetrate, and protrude upwardly from, said upper textile layer, and (d) placing an ironing unit comprising a heatable ironing plate and a pressure plate being elastic, temperature-stable and heat conductive and being attached to the underside of the said ironing plate which latter is heatable, with the underside of said pressure plate on the the upper textile layer so that the still protruding nail ends are embedded in the pressure plate.

As a further step (e), the ironing plate is then heated and pressure exercised on the composite ironing and pressure plates to compress and weld together the said upper and lower textile layers with the heating circuit embedded therebetween. The composite ironing and pressure plates can then be lifted off, and the finished heating appliance can be taken off the nail-studded template.

The thermic affixing, e.g. by gluing or welding, of the upper and lower textile layers is preferably carried out at temperatures of up to 250° C. The material of which the textile layers, the lower one of which is placed on the nail-studded template and the upper one is placed on the lower textile layer, are constituted, is chosen in accordance with the temperature and pressure to be applied.

Moreover, the elasticity coefficients of the pressure plate affixed on the underside of the ironing plate are so chosen that the nail ends will penetrate into the pressure plate without disturbing the evenness of the same, and, when the composite ironing and pressure plates are withdrawn, the volume occupied by the nails during the heat and pressure treatment of step (e), supra, will be reoccupied practically completely by the elastic material of the pressure plate.

In a preferred embodiment of the invention, an adhesive layer is interposed between the lower and the upper textile layers before the heat-welding of the two layers.

Preferably, the pressure plate of the composite plates is attached to the underside of the ironing plate by gluing or in a similar, separable manner, whereby, after each treatment or number of treatments in which the nail holes in the underside of the pressure plate have affected the evenness of the pressure plate excessively, the pressure plate can be slightly displaced on the underside of the ironing plate. Eventually, the pressure plate can be completely removed from the underside of the ironing plate and can be replaced by a new one.

BRIEF DESCRIPTION OF THE DRAWING

The method according to the invention will be further explained more in detail with regard to the accompanying drawing in which.

DETAILED DESCRIPTION OF THE IRONING PRESS SHOWN IN THE DRAWING

Figure 1:
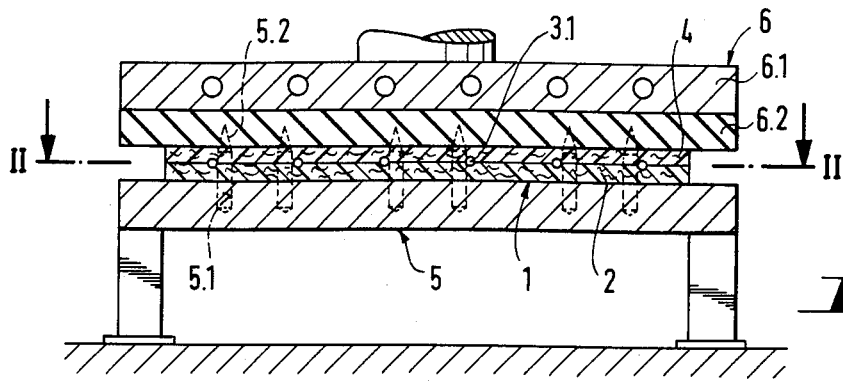
FIG. 1 shows a cross-sectional view of an ironing press comprising an ironing plate and pressure plate together with a nail-studded template and the components of a heating appliance therebetween, illustrating a heating-and-pressure phase of the method according to the invention.
Figure 2:
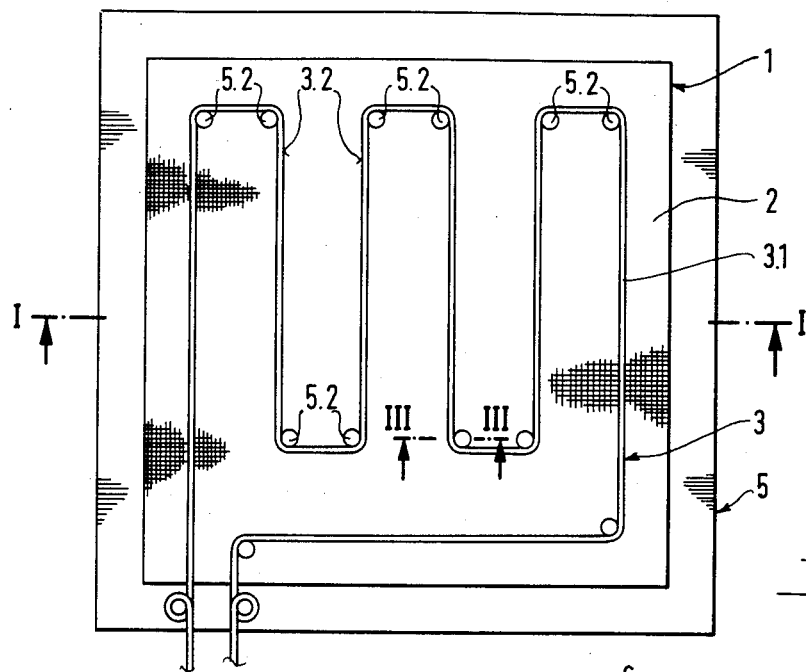
FIG. 2 shows a horizontal sectional view of the same ironing press taken in a plane indicated by II—II in FIG. 1, while I—I in FIG. 2 indicates the plane in which the view of FIG. 1 is taken.
Figure 3:
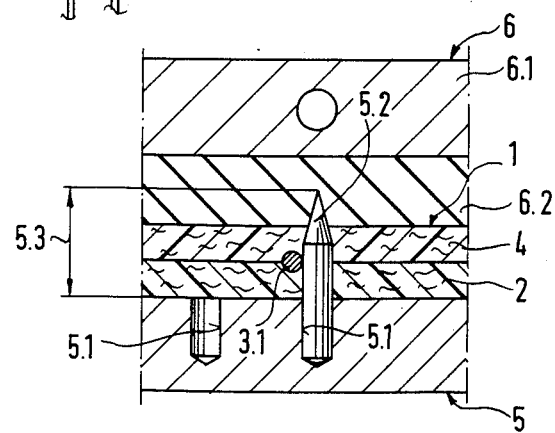
FIG. 3 shows an enlarged partial view, likewise in cross-section, taken in a plane indicated by III—III in FIG. 2.

The heating appliance 1 consists of a lower layer 2 which has been placed on a nail-studded template 5, on the upper side of the lower layer 2 there has been laid a heating circuit 3 constituted by a heating wire 3.1, in meandering configuration, and an upper layer 4 has been placed thereon to cover the heating circuit 3.

The layers 2 and 4 are combined with the inclusion of the heating circuit therebetween, by the application of heat and pressure, to form a unit constituting the heating appliance 1. The nail-studded template 5 consists of a rigid plate having blind holes or bores 5.1 into which nails preferably having no heads can be inserted. Template 5 is supported by legs 7. The holes 5.1 are provided at short distances from each other, which are preferably uniformly distributed over the upper surface of the template 5, whereby adaptation of the wiring to different circuitry layouts can be rapidly achieved in a simple manner.

The illustrated embodiment shows a meandering configuration 3.2 of the heating circuit 3. The covering layer 4 is pushed down on the protruding nail ends 5.3 and the layers 2 and 4 are then united, as mentioned hereinbefore, by the application of pressure and heat, e.g. 250° C. Depending on the nature of the material of the layers 2 and 4, the union of these layers may be strengthened or accelerated by providing an intermediate layer of adhesive between them which is preferably initially applied on the top surface of the lower layer 2.

The composite ironing device 6 consists of a heatable preferably metallic ironing plate 6.1, the underside of which, facing toward the upper layer 4, bears an elastic pressure plate 6.2 which is of good heat conductivity and, at the same time, is stable at temperatures up to about 250° C., being connected with the ironing plate 6.1 preferably by thermal gluing. The quality of the material from which the pressure plate 6.2 is made is so chosen that about 10,000 penetrations of the nail ends of the template nails can be made without requiring exchange of the pressure plate 6.2.

The ironing plate and the template are preferably made of steel, the pressure plate of the ironing unit consists preferably of silicone caoutchouc, the nails of the template can be made of steel and an optionally used adhesive layer can consist of hot-sealing epoxy-resin. Preferably, this resin is applied to the upper surface of the lower textile in powder form. Suitable hot-sealing adhesives are also described in Kirk-Othmer, "Encyclopedia of Chem.Tech." 3rd Div. Vol. 1, pages 490 et seq. (1970).

I claim:

1. An apparatus for the manufacture of a flexible heating appliance which comprises a heating circuit having at least one continuous heating wire, said wire placed between textile materials being heat-attachable with one another, said apparatus comprising:
   (a) a template comprising a rigid steel plate having an upper surface and a lower surface;
   (b) said rigid plate having a plurality of blind holes distributed uniformly over said upper surface;
   (c) legs attached to said lower surface supporting said rigid plate;
   (d) a plurality of steel nails having a point on a first end and no head on a second end, said second ends inserted into said blind holes in a given pattern defining a configuration for said heating circuit;
   (e) a steel ironing plate having an underside positioned above said template and having means for heating to a temperature of up to about 250° C.; and
   (f) an elastic pressure plate attached to said underside comprising a material absorbing 10,000 penetrations of said points without requiring exchange of said pressure plate.

2. The apparatus of claim 1, wherein said elastic pressure plate is comprised of silicone caoutchouc.

3. The apparatus of claim 2, wherein said elastic pressure plate is heat sealed to said underside.

* * * * *